United States Patent
Ko

(10) Patent No.: US 6,572,698 B1
(45) Date of Patent: Jun. 3, 2003

(54) ACTIVATED ALUMINOSILICATE BINDER

(75) Inventor: Suz-Chung Ko, Lenzburg (CH)

(73) Assignee: International Mineral Technology AG, Fribourg (CH)

( * ) Notice: Subject to any disclaimer, the term of this patent is extended or adjusted under 35 U.S.C. 154(b) by 0 days.

(21) Appl. No.: 09/720,869

(22) PCT Filed: Jun. 29, 1999

(86) PCT No.: PCT/IB99/01219

§ 371 (c)(1),
(2), (4) Date: Jan. 2, 2001

(87) PCT Pub. No.: WO00/00448

PCT Pub. Date: Jan. 6, 2000

(30) Foreign Application Priority Data

Jun. 30, 1998 (EP) .............................. 98890191

(51) Int. Cl.⁷ .............................. C04B 9/04; C04B 9/06; C04B 9/11; C04B 11/00; C04B 11/28
(52) U.S. Cl. ........................ 106/772; 106/773; 106/774; 106/778
(58) Field of Search ................. 106/772, 773, 106/774, 778, 781, 782, 785, 788

(56) References Cited

U.S. PATENT DOCUMENTS

| | | | | |
|---|---|---|---|---|
| 4,407,677 A | * | 10/1983 | Wills, Jr. ................... | 106/716 |
| 4,451,295 A | | 5/1984 | Sprouse | |
| 4,911,757 A | | 3/1990 | Lynn et al. | |
| 4,971,627 A | | 11/1990 | Koslowski et al. | |
| 5,626,665 A | | 5/1997 | Barger et al. | |
| 5,997,599 A | * | 12/1999 | Wommack et al. ........ | 23/313 P |

FOREIGN PATENT DOCUMENTS

| | | |
|---|---|---|
| EP | 0 103 119 | 3/1984 |
| EP | 0 600 155 | 6/1994 |
| WO | WO 83/01443 | 4/1983 |
| WO | WO 89/04815 | 6/1989 |

OTHER PUBLICATIONS

Chemical Abstracts, vol. 123, No. 18, Oct. 30, 1995, Columbus, Ohio, US; abstract No. 236021s, p. 549 XP000661754 *abstract* & Amin, A..M.: "Activation of granulated slag with calcined cement kiln dust" Buildiing Research Institute, Cairo, Egypt, vol. 60, No. 3–4, 1995, pp. 109–115 (No Month).

Chemical Abstracts, vol. 120, No. 13, Jun. 27, 1994, Columbus, Ohio, US; abstract No. 329712w, p. 403; XP000494261 *abstract* &Bian, Qinghan et al.: "Study of alkali–slag cement manufactured by using pozzolanic materials to replace blast furnace slag" Dep. Mater. Sci.Eng., Nanjing Inst. of Chem. Technol., vol. 15, No. 4, 1993, pp. 47–52.

Database WPI Section Ch., Week 199337 Derwent Publications Ltd., London, GB; Class L02, AN 1993–294380 XP002120807 & SU 1 763 405 A (Rudnenskii Ind Inst), Sep. 23, 1992 abstract.

Patent Abstracts of Japan vol. 016, No. 334 (C–0964), Jul. 21, 1992 & JP 04 097932 A (Denki Kagaku Kogyo KK), Mar. 30, 1992 abstract.

* cited by examiner

Primary Examiner—Elizabeth D. Wood
(74) Attorney, Agent, or Firm—Kevin E. Joyce

(57) ABSTRACT

An activated aluminosilicate binder containing aluminosilicates, calcium sulphate and an activator containing alkali metal salts is disclosed. The aluminosilicates are selected from a group consisting of blast furnace slag, clay, marl and industrial by-products, such as fly ash, and has an $Al_2O_3$ content greater than 5% by weight. Blast furnace slag is present in an amount less than 35% by weight, and cement kiln dust, in an amount of from 1 to 20% by weight, is added to the mixture as an activator.

12 Claims, No Drawings

ACTIVATED ALUMINOSILICATE BINDER

BACKGROUND OF THE INVENTION

1. Field of the Invention

The invention relates to an activated aluminosilicate binder containing aluminosilicates, calcium sulphate and an activator containing alkali metal salts.

2. Prior Art

The composition and manufacture of a supersulphated metallurgical cement is based on the addition of calcium sulphate to the cement. According to the International Standard Organisation (ISO), supersulphated cement is defined as a mix of at least 75% by weight of crushed granulated blast furnace slag, large additions of calcium sulphate (>5% by weight $SO_3$) and a maximum of 5% by weight of hydrated lime, portland cement clinker or portland cement.

In order to produce a supersulphated cement, the granulated slag must contain at least 13% by weight of $Al_2O_3$ and respond to the formula $(CaO+MgO+Al_2O_3)/SiO_2 > 1.6$ according to the German Standards. According to Keil, a 15 to 20% alumina slag amount is preferred at a minimum modulus of $(CaO+CaS+0.5\ MgO+Al_2O_3)/(SiO_2+MnO) > 1.8$. According to Blondiau, the $CaO/SiO_2$ ratio must be between 1.45 and 1.54 and the $Al_2O_3/SiO_2$ ratio must be between 1.8 and 1.9.

Lime, clinker or cement is added in order to raise the pH in the cement paste and to facilitate the solubilization of alumina in the liquid phase during the hydration of the cement. The hardening of supersulphated metallurgical cement can be achieved without any chemical additives or special shaping treatment.

In ordinary portland cements and metallurgical cements, in which hydration is effected in a liquid phase exempt from alumina in solution, the calcium sulphate content is limited to a low percentage in order to avoid possible internal disintegration due to the formation of calcium sulphoaluminate (Candlot bacilli) as a result of the alumina having not entered into solution. In those cements, the predominating influence of calcium sulphate is the retarding effect it exerts on the setting time. The basicity of the hydrated calcium aluminates, as well as the insolubilization of the alumina contained in the aluminates, depend on the concentration of lime in the liquid phase of the cement during hydration irrespective of whether the hydrated calcium aluminates are present in the hardened cement in the crystalline or in the amorphous form. The concentration of lime in the liquid phase determines the type of influence of the calcium sulphate on the setting time of the cement and the maximum calcium sulphate amount the cement may contain without giving rise to the phenomenon of internal disintegration by deferred ettringite formation.

In the supersulphated metallurgical cement, the concentration of lime in the liquid phase is below the limit of insolubilization of the alumina. Larger additions of calcium sulphate aimed at activating the reactions of blast furnace slag determine the formation of tricalcium sulphoaluminate of great hydraulic activity, based on the lime and alumina in solution, without giving rise to possible disintegration. The addition of calcium sulphate to granulated blast furnace slag will not produce an expansive cement but act as an accelerating agent in the formation of hydrated constituents. In the supersulphated cement larger percentages of calcium sulphate are not to be considered as a nuisance. The tricalcium sulphoaluminates to which they give rise rather contribute to raising hydraulic activity instead of causing disintegration as in the case of portland cement and normal metallurgical cement.

The initial setting and hardening of supersulphated cement is associated with the formation of the high-sulphate form of calcium sulphoaluminate from the slag components and the calcium sulphate added. The addition of portland cement to cement is required to adjust the correct alkalinity in order to enable the formation of ettringite. The main hydrated products are the mono- and trisulphoaluminate tobermorite-like phase and alumina.

Supersulphated cement combines with more water on hydration than does portland cement. It complies with all standard cement specifications in terms of grinding fineness. It is considered as a low heat cement. It may be used in the form of concrete, mortar for masonry or grout like any other portland or metallurgical cements. The conditions to be observed in the use of supersulphated cement are identical with those governing the choice, mix and placing of other cements.

In order to improve aluminosilicate binders, it has already been suggested to activate the same with alkali and, in particular, with soda lye or caustic potash solution.

Alkali activated aluminosilicate binders (AAAS) are cementitious materials formed by reacting fine silica and alumina solids with a solution of alkali or alkali salts in order to produce gels and crystalline compounds. Alkali activation technology originally was developed in 1930 to 1940 by Purdon, who discovered that the addition of alkali to slag yields a rapidly hardening binder.

As opposed to supersulphated cement, a wide variety of materials (natural or calcined clay, slag, fly ash, belite sludges, ground rock, etc.) may be used as a source of aluminosilicate materials. Different alkali solutions may be used to produce hardening reactions (alkali hydroxide, silicate, sulfate and carbonate, etc.). This means that the sources of AAAS binders are almost unlimited.

During alkali activation, the aluminosilicates are affected by a high concentration of OH ions in the mix. While a pH>12 in portland or supersulphated cement paste is provided by the solubility of calcium hydroxide, the pH in the AAAS system exceeds 13.5. The amount of alkali, which in general is 2 to 25% by weight of alkali (>3% $Na_2O$), depends on the aluminosilicate alkalinity.

The reactivity of AAAS binder depends on its chemical and mineral composition, the degree of vitrification and the fineness of grinding. In general, AAAS binders may start to set within 15 minutes and have rapid hardening and large strength gain in the long term. The setting reaction and the hardening process are still not understood completely. They proceed with the initial leaching of alkali and the formation of weakly crystalline calcium hydrosilicates of the tobermorite group. Calcium aluminosilicates start to crystallize to form zeolite-like products and, subsequently, alkali zeolites.

The strength values in the AAAS system have been attributed to the strong crystallization contacts between zeolites and calcium hydrosilicates. The hydraulic activity is enhanced by increasing the alkali doses. The relation between the hydraulic activity and the amount of alkalis as well as the presence of zeolite in the hydrated products have proved that alkalis do not act only as simple catalysts, participate in reactions in the same way as lime and gypsum, and are relatively strong due to a strong cationic influence.

Many studies on the activation of silicoaluminate materials with alkalis and their salts have been reported.

SUMMARY OF THE INVENTION

It is the object of the present invention to activate an aluminosilicate binder by largely avoiding the use of expensive chemicals such as soda lye or caustic potash solution, while obtaining strength values of standard binders at the same time. By reducing the OH ions in the mix, the pH is lowered to values corresponding to the values of common supersulphated cement. At the same time, a large number of different aluminosilicate starting products are usable such that the aluminosilicates may be produced from cheap industrial sources by mixing, sintering or melting different materials and, in particular, waste substances.

DETAILED DESCRIPTION OF PREFERRED EMBODIMENTS OF THE INVENTION

To achieve this object, the activated aluminosilicate binder essentially is characterized in that the aluminosilicates are selected from the group consisting of blast furnace slag, clay, marl and industrial by-products, such as fly ash, with the proviso that the $Al_2O_3$ content is greater than 5% by weight, wherein blast furnace slag is present in an amount less than 35% by weight and in that cement kiln dust, in an amount of from 1 to 20% by weight, is added to the mixture as an activator. By using cement kiln dust as an activator, OH ions may be obviated and the pH may be reduced accordingly. It has been surprisingly shown that the activation by cement kiln dust is largely insensitive to the choice of the starting products. Surprisingly, it is possible to use any granulated blast furnace slag to produce new activated supersulphated binders, it being no longer necessary to observe the chemical modulus or ratio. In addition, the activation of slag by clinker or portland cement is no longer necessary in order to start hydration reactions. Finally, sulfate activation produces ettringite with silicoaluminate materials other than granulated slag. The silicoaluminate can be produced in an industrial process by mixing, sintering or melting different materials (clay, marl, zeolite, metakaolin, red mud, slag, fly ash, belite sludge, ground rock, etc.). By limiting the amount of blast furnace slag to below 35% per weight, higher amounts of cement kiln dust and fly ash can be used and major proportions of limestone can be added. Since fly ash contains usually $CaSO_4$, no further addition of $CaSO_4$ may be required for activation.

According to the invention, the aluminosilicates are selected from the group consisting of blast furnace slag and/or clay and/or marl and/or industrial by-products with the proviso that the $Al_2O_3$ content is greater than 5% by weight.

Useful further components are zeolite and/or basalt and/or limestone.

It is particularly advantageous if clay or marl is used after thermal activation by heat treatment at temperatures of from 600° C. to 850° C.

In principle, the activated aluminosilicate binder should comprise 75% by weight of aluminosilicate, wherein the major portion may be substituted by conventional blast furnace slags or other materials and, in particular, waste substances. A preferred binder, therefore, is characterized in that the sum of the contents of blast furnace slag, clay, marl, zeolite and fly ash ranges between 75 and 90% by weight of the mixture. Blast furnace slag is present in an amount below 35% by weight.

As already mentioned in the beginning, the use of OH ions for activation may be obviated. Where alkali activation is to exhibit additional advantages, substantially smaller amounts of alkali hydroxide are required and, as a result, alkali hydroxide is added as an alkali activator in an amount of less than 1% by weight and, preferably, less than 0.5% by weight.

The setting and curing properties of the binder according to the invention may be influenced in a conventional manner. Thus, according to a preferred further development of the invention, plasticizers and/or superplasticizers such as naphthalene-sulfonate and/or citric acid and/or water reducing agents are added to the mixture in an amount of 0.2 to 2% by weight.

The binder according to the invention appears to be particularly advantageous if it is ground to a Blaine fineness exceeding 3500 $cm^2/g$.

Activation for improvement of early strength can be achieved if $Li_2SO_4$ or $ZrOCl_2$ is added in an amount of 0.1 to 0.5% by weight.

On the whole, large additions of calcium sulphate and relatively slight amounts of activator may be applied, wherein a cement is obtained which is very similar to supersulphated metallurgical cement and complies with all standard cement specifications in terms of grinding fineness. It is considered as a low heat cement. It may be used in the form of concrete, mortar for masonry or grout like any other portland or metallurgical cements. The conditions to be observed in the use of silicoaluminate binders according to the invention are identical with those governing the choice, mix and placing of other portland and blended cements.

In order to grind the new binder to a Blaine fineness of at least 3500 $cm^2/g$, intergrinding, blending or a combination of grinding and blending of components in recommended proportions may be applied. The different components may be blended together during silicoaluminate milling or during concrete preparation.

The workability, placement, compaction and finishing characteristics, based on normal water requirements with no excessive slump loss, are equal to those of normal portland or slag cement concrete. The incorporation of additives during the mixing of the grout, mortar or concrete may prove very beneficial. Higher impermeability and strength values will be obtained in the final concrete with less water at a given plasticity. The use of plasticizers, superplasticizers and water reducing agents largely reduces the W/B ratio while maintaining good workability.

On the whole, it has been highly surprising that the addition of cement kiln dust to supersulphated aluminosilicate binders yields excellent activation results while simultaneously enabling the disposal of cheap by-product substances available in sufficient quantities. Tests have shown that even slight amounts of cement kiln dust induce activation, wherein the exact mechanisms of this activation have not been clarified so far.

The manufacture of alkali activated cement requires no special components but uses common or secondary raw materials. Thus, it is possible to use a large variety of raw materials such as, for instance, natural products, by-products and industrial wastes such as silicoaluminates ($Al_2O_3>6\%$ by weight). For the activation, waste products and, in particular, cement kiln dust is used. Any type of calcium sulfate such as, for instance, natural and industrial waste gypsum or anhydrite, dihydrate or anhydrous materials can be used to prepare the sulfate in the new binder.

In the following Table, exemplary embodiments are illustrated by way of different activated aluminosilicate binders, the respective compositions being indicated.

TABLE

Activated Aluminosilicate Binders

|  | 1 (wt %) | 2 (wt %) | 3 (wt %) |
|---|---|---|---|
| CKD | 5 | 10 | 10 |
| BFS |  |  | 20 |
| CaSO$_4$ anhydrite |  |  | 15 |
| Marl 1) |  |  | 37 |
| Basalt |  |  | 17 |
| FA | 94.5 | 89.5 |  |
| Plasticizer | 0.5 | 0.5 | 1 |
| Mortar (modified EN 196) 2) |  |  |  |
| W/C | 0.31 | 0.31 | 0.34 |
| 2D CS (MPa) | 26.8 | 24.1 | 36.9 |
| 28D CS (MPa) | 50.0 | 46.6 | 59.3 |

CKD = Cement Kiln Dust
BFS = Blast furnace slag
FA = Fly ash
1) thermally activated at 750° for 2 hours
2) To produce flow 190–210 cm

What is claimed is:

1. An activated aluminosilicate binder composition containing aluminosilicates, calcium sulphate and an activator containing alkali metal salts, wherein the aluminosilicates are selected from a group consisting of blast furnace slag, clay, marl and industrial by-products, the aluminosilicates having an Al$_2$O$_3$ content greater than 5% by weight of the composition, and wherein cement kiln dust, in an amount of from 1 to 20% by weight of the composition, is included as an activator.

2. An activated aluminosilicate binder composition according to claim 1, additionally containing zeolite, basalt and/or limestone.

3. An activated aluminosilicate binder composition according to claim 2, wherein the aluminosilicates include clay or marl thermally activated by heat treatment at temperatures of from 600° C. to 850° C.

4. An activated aluminosilicate binder composition according to claim 1, wherein the composition additionally includes zeolite, and the sum of blast furnace slag, clay, marl, fly ash and zeolite ranges between 75 and 90% by weight of the composition.

5. An activated aluminosilicate binder composition according to claim 1, wherein the activator further comprises alkali hydroxide in an amount of less than 0.5% by weight of the composition.

6. An activated aluminosilicate binder composition according to claim 1, further comprising plasticizers and/or superplasticizers in an amount of 0.2 to 2% by weight of the composition.

7. An activated aluminosilicate binder composition according to claim 1, wherein the binder is ground to a Blaine fineness exceeding 3500 cm$^2$/g.

8. An activated aluminosilicate binder composition according to claim 1, further comprising an accelerator in an amount of 0.1 to 0.5% by weight of the composition.

9. An activated aluminosilicate binder composition according to claim 1, wherein said industrial by-products include fly ash.

10. An activated aluminosilicate binder composition according to claim 1, wherein the aluminosilicates include blast furnace slag in an effective amount greater than zero but less than 35% by weight of the composition.

11. An activated aluminosilicate binder composition according to claim 6, wherein said plasticizers and/or superplasticizers comprise napthalenesulfonate and/or citric acid.

12. An activated aluminosilicate binder composition according to claim 8, wherein said accelerator comprises Li$_2$SO$_4$ or ZrOCl$_2$.

* * * * *